United States Patent [19]

Matsuda

[11] Patent Number: 5,699,040
[45] Date of Patent: Dec. 16, 1997

[54] VEHICLE COLLISION PREVENTING SYSTEM

[75] Inventor: Shohei Matsuda, Wako, Japan

[73] Assignee: Honda Giken Kogyo Kabushiki Kaisha, Tokyo, Japan

[21] Appl. No.: 749,358

[22] Filed: Nov. 20, 1996

[30] Foreign Application Priority Data

Nov. 21, 1995 [JP] Japan ................................. 7-302545

[51] Int. Cl.$^6$ ............................................. B60Q 1/00
[52] U.S. Cl. ..................... 340/435; 340/903; 340/904; 342/70; 342/71; 367/909; 180/169; 364/461; 364/426.04
[58] Field of Search ........................ 340/435, 436, 340/901, 903, 904; 342/70, 71; 367/909, 112, 96, 97, 107; 180/167, 168, 169, 170; 364/460, 461, 426.04

[56] References Cited

U.S. PATENT DOCUMENTS

| | | | |
|---|---|---|---|
| 4,766,421 | 8/1988 | Beggs et al. | 340/904 |
| 5,321,407 | 6/1994 | Kikuchi et al. | 342/70 |
| 5,473,538 | 12/1995 | Fujita et al. | 342/70 |
| 5,530,651 | 6/1996 | Uemura et al. | 364/461 |
| 5,546,086 | 8/1996 | Akuzawa et al. | 342/70 |
| 5,598,163 | 1/1997 | Cormic et al. | 342/70 |

FOREIGN PATENT DOCUMENTS 4-362451   12/1992   Japan.

*Primary Examiner*—Thomas Mullen
*Assistant Examiner*—Nina Tong
*Attorney, Agent, or Firm*—Nikaido, Marmelstein, Murray & Oram LLP

[57] ABSTRACT

In a vehicle collision preventing system, a possibility of collision of a subject vehicle against an object ahead of the subject vehicle is determined at least based on values measured by a distance measuring unit for measuring longitudinal and lateral distances between the subject vehicle and the object and a value detected by a subject-vehicle speed detecting device, an actuator is operated in accordance with the result of such determination to avoid the collision. A lateral relative distance of the subject vehicle and the object is calculated by a lateral relative distance calculating device based on the values measured in the distance measuring unit. Any of a judge level in the judgment of the collision possibility in a judging device or operation levels of actuators is changed in accordance with the result of the determination in a collision avoidance level determining device based on the lateral relative distance. Thus, the actuators are operated in accordance with a variation in lateral relative distance between the subject vehicle and the object, so that the collision preventing operations of the actuators are more easily accepted by a driver.

1 Claim, 3 Drawing Sheets

VEHICLE COLLISION PREVENTING SYSTEM

BACKGROUND OF THE INVENTION

1. Field of the Invention

The present invention relates to a vehicle collision preventing system comprising: a distance measuring unit for calculating longitudinal and lateral distances from a subject vehicle to an object ahead of the vehicle by transmitting a signal in a forward direction of the vehicle within a predetermined lateral range and receiving a signal reflected from the object; a subject-vehicle speed detecting means for detecting a travel speed of the subject vehicle; a judging means for judging a possibility of collision of the subject vehicle against the object at least based on a value measured by the distance measuring unit and a subject vehicle speed detected by the subject-vehicle speed detecting means; an actuator for conducting an action required for avoiding the collision of the subject vehicle against the object; and an operation control means for controlling the operation of the actuator based on the result of the judgment in the judging means.

2. Description of the Related Art

Such a system is conventionally known, for example, from Japanese Patent Application Laid-open No.4-362451.

In such known system, it is determined whether the subject vehicle will collide against an object such as a vehicle traveling ahead of the subject vehicle after a lapse of a certain reference time, and if it is determined that there is a possibility of the collision, a warning device or an alarm is operated, or brakes are automatically operated. If an attempt is made to avoid the collision of the subject vehicle against the vehicle traveling ahead of the subject vehicle, a distance required to avoid the collision by a steering operation is shorter than that required to avoid such collision only by braking operation. In the known system, however, when the distance between the subject vehicle and the object ahead of the subject vehicle becomes shorter than a reference distance, the warning device is operated, or the automatic brakes are operated. And even when the driver of the vehicle attempts to avoid the collision by the steering operation, the warning device or the automatic brakes are operated, which is difficult to be accepted by the driver.

Therefore, there is an already proposed technique adapted to enhance the effect of preventing the collision by the warning or the automatic braking without obstructing a normal avoiding operation by steering by the driver, wherein a distance from the subject vehicle to the object ahead of the subject vehicle and a relative speed of the subject vehicle relative to the object are used as parameters, and when it is determined that it is difficult to avoid the collision by the normal steering operation conducted by the driver, the warning device or the automatic brakes are operated. However, as a degree of overlapping between the subject vehicle and the vehicle traveling ahead of the subject vehicle as viewed in a longitudinal direction (in a traveling direction) is greater, a possible distance therebetween which is necessary to avoid the collision becomes shorter. In the above proposed technique in which a timing for operating the warning device or the automatic brakes is determined based on the distance from the subject vehicle to the object relative to a certain relative speed, a sufficient effect can be exhibited if the level of avoidance of the collision by the steering operation is varied in accordance with the degree of overlapping in the longitudinal direction.

SUMMARY OF THE INVENTION

Accordingly, it is an object of the present invention to provide a vehicle collision preventing system, wherein an actuator is operated to avoid the collision in accordance with a variation in lateral relative distance between the subject vehicle and the object, so that the operation of the actuator is more fitted to a driver's feeling and easily accepted by a driver.

To achieve the above object, according to the present invention, there is provided a vehicle collision preventing system comprising: a distance measuring unit for calculating longitudinal and lateral distances from a subject vehicle to an object ahead of the vehicle by transmitting a signal in a forward direction of the vehicle within a predetermined lateral range and receiving a signal reflected from the object; a subject-vehicle speed detecting means for detecting a travel speed of the subject vehicle; a judging means for judging a possibility of collision of the subject vehicle against the object at least based on a value measured by said distance measuring unit and a subject vehicle speed detected by said subject-vehicle speed detecting means; an actuator for conducting an action required for avoiding the collision of the subject vehicle against the object; and an operation control means for controlling the operation of the actuator based on the result of said judgment in said judging means, wherein said collision preventing system further includes a lateral relative distance calculating means for calculating a lateral relative distance between the subject vehicle and the object based on the value measured by said distance measuring unit; and a collision avoidance level determining means for changing, based on a value calculated by said lateral relative distance calculating means, any one of a judge level in the judgment of a possibility of collision in said judging means and an operation level of the actuator determined by said operation control means based on the result of said judgment by said judging means.

With such arrangement, it is determined based on the lateral relative distance between the subject vehicle and object whether the collision can be avoided by the steering operation, and the level of judgment of the possibility of collision or the operation level of the actuator is changed in accordance with the result of such determination. Thus, the drive feeling is enhanced, and the operation of the actuator is more easily accepted by the driver.

The above and other objects, features and advantages of the invention will become apparent from the following description of preferred embodiments taken in conjunction with the accompanying drawings.

DETAILED DESCRIPTION OF THE PREFERRED EMBODIMENTS

The present invention will now be described by way of preferred embodiments with reference to the accompanying drawings.

Figure 1:
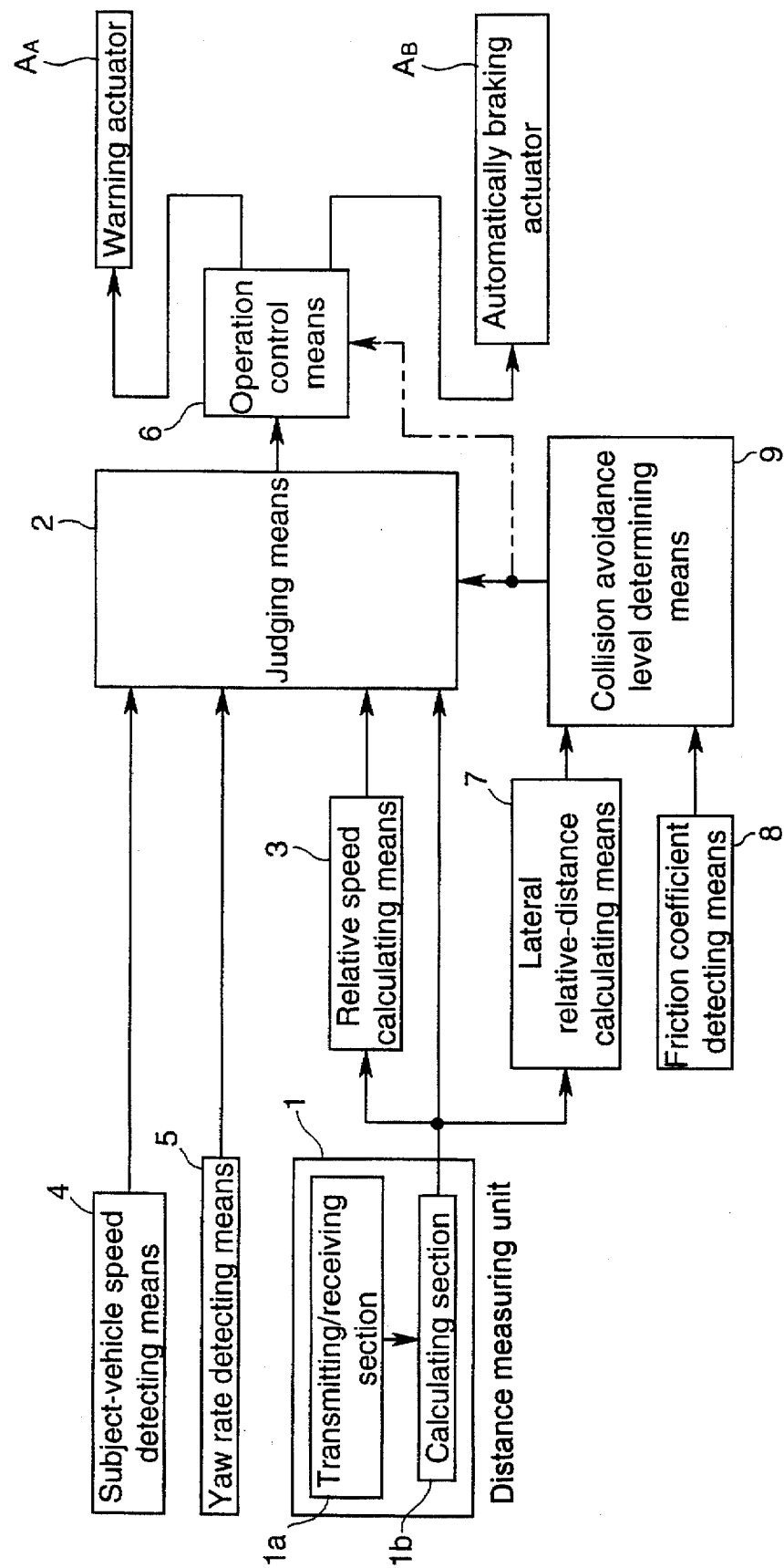
FIG. 1 is a block diagram illustrating the arrangement of a collision preventing system according to a first embodiment of the present invention.
Figure 2:
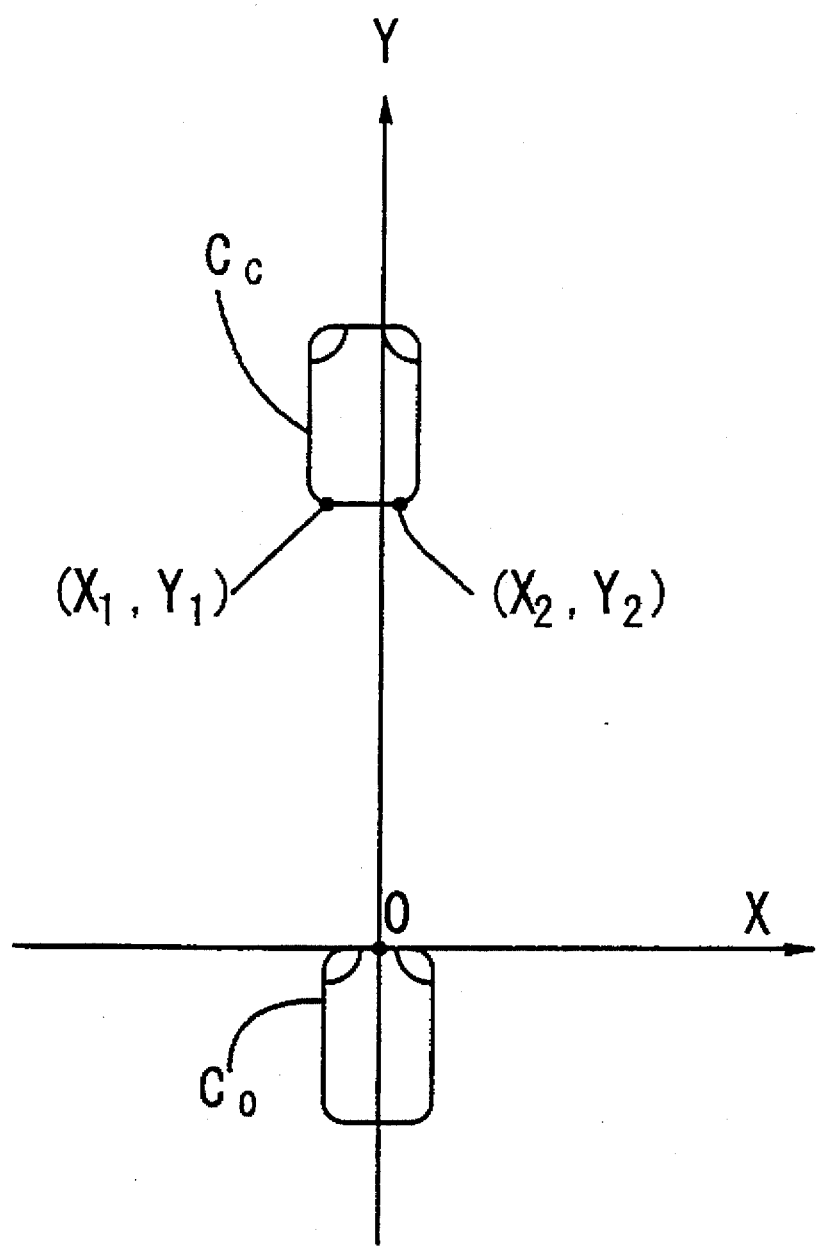
FIG. 2 shows a coordinates system of a subject vehicle and an object.

Referring first to FIG. 1, an automobile vehicle includes a distance measuring unit 1 mounted at its front portion and capable of detecting a longitudinal distance and a lateral distance from the subject vehicle to an object by transmitting a signal in a forward direction of the vehicle within a predetermined lateral range and receiving a signal reflected from the object ahead of the vehicle. The distance measuring unit 1 includes a transmitting/receiving section 1a capable of transmitting the signal in a forward direction from the vehicle and receiving the signal reflected from the object, and a calculating section 1b for calculating a longitudinal (in a direction of a Y axis) position and a lateral (in a direction of an X axis) position of the object based on a time taken from the transmission of the signal to the reception of the signal. In the calculating section 1b, a coordinate development of the detected object is performed. More specifically, if the coordinates point of the subject vehicle $C_0$ is represented by (0, 0), the coordinates point (X, Y) of a vehicle $C_C$ as an object ahead of the subject is determined by averaging coordinates points $(X_1, Y_1)$ and $(X_2, Y_2)$ of a reflectors located on opposite sides of a rear portion of the vehicle $C_C$ traveling ahead of the subject.

A value calculated in the distance measuring unit 1 is input to a judging means 2 and to a relative-speed calculating means 3. In the relative-speed calculating means 3, a relative speed $\Delta V$ between the subject vehicle $C_0$ and the vehicle $C_C$ traveling ahead of the subject vehicle is calculated as a vector amount, based on a time variation in the value calculated in the distance measuring unit 1. The calculated relative speed $\Delta V$ is input to the judging means 2.

A travel speed of the subject vehicle $C_0$ detected by a subject-vehicle speed detecting means 4 and a yaw rate of the subject vehicle $C_0$ detected by a yaw rate detecting means 5 are also input to the judging means 2. In the judging means 2, a warning reference distance $L_A$ determined by multiplying the relative speed $\Delta V$ by a given time $t_1$ and a collision-avoiding level determining factor K is set in the judging means 2, and a automatic-braking reference distance $L_B$ determined by multiplying the relative speed $\Delta V$ by a time $t_2$ shorter than the time $t_1$ and the collision-avoiding level determining factor K is also set in the judging means 2. The time $t_1$ is set as a time for emitting a warning prior to a braking operation when there is a possibility of collision of the subject vehicle. The time $t_2$ is set shorter than a time enough to be able to avoid the collision of the subject vehicle against the vehicle $C_C$ ahead of the subject vehicle by a driver's steering operation in a condition in which there is no widthwise deviation between the subject vehicle $C_0$ and the vehicle $C_C$ as viewed in a longitudinal direction (traveling direction).

In the judging means 2, a travel speed of the subject vehicle $C_0$ is determined as a vector amount by a value detected by the subject-vehicle speed detecting means 4 and a value detected by the yaw rate detecting means 5. And in a condition in which it is determined based on the subject vehicle vector and the relative speed vector that the subject vehicle $C_0$ and the vehicle $C_C$ traveling ahead of the subject vehicle are in a predetermined range after lapse of the times $t_1$ and $t_2$, the distance between the subject vehicle $C_0$ and the vehicle $C_C$ is compared with the warning reference distance $L_A$ and the automatically braking reference distance $L_B$. When the distance between the subject vehicle $C_0$ and the vehicle Cc becomes equal to or smaller than the warning reference distance $L_A$, a warning signal is output from the judging means 2. When the distance between the subject vehicle $C_0$ and the vehicle $C_C$ becomes equal to or smaller than the automatically braking reference distance $L_B$, an automatically braking signal is output from the judging means 2.

The signals from the judging means 2 are input to an operation control means 6. The operation control means 6 operates a warning actuator $A_A$ in response to inputting of the warning signal, and operates an automatically braking actuator $A_B$ in response to inputting of the automatically braking signal.

The value measured by the distance measuring unit 1 is also input to a lateral relative-distance calculating means 7. In the lateral relative-distance calculating means 7, a lateral relative distance between the subject vehicle $C_0$ and the vehicle is calculated based on the value measured by the distance measuring unit 1. Here, the lateral relative distance means a distance of widthwise deviation between the two vehicles as viewed in a longitudinal direction (in a traveling direction). The calculated lateral relative distance is input to a collision avoiding level judging means 9. A value detected by a friction coefficient, detecting means 8 for detecting a friction coefficient of a road (which will be referred to as a travel road hereinafter) on which the subject vehicle is traveling is also input to the collision avoiding level judging means 9.

Figure 3:
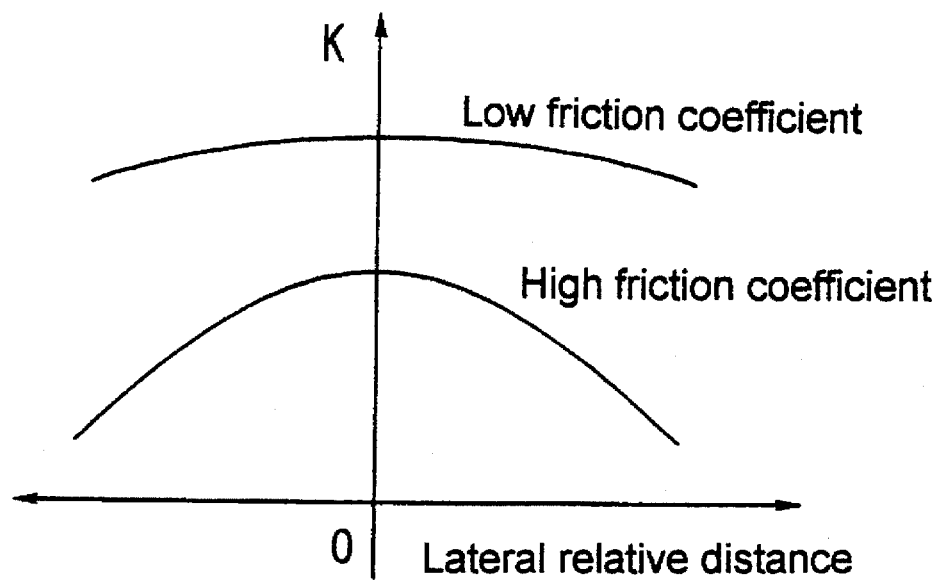
FIG. 3 shows the collision avoidance level determining factor set in a collision avoidance level determining means.

A collision avoiding level determining factor K equal to or larger than 1 is set In the collision avoiding level determining means 9 in accordance with the lateral relative distance and the friction coefficient of the travel road, as shown in FIG. 3. The avoidance level determining factor K is smaller in variation rate attendant on a variation in lateral relative distance, as the friction coefficient of the travel road is lower, and moreover, the collision avoidance level determining factor K is decreased with an increase in friction coefficient of the travel road, and is decreased with an increase in lateral relative distance. Such a collision avoidance level determining factor K is determined in the collision avoidance level determining means 9 and applied to the judging means 2.

Therefore, a judge level in judging the possibility of the collision in the judging means 2, i.e., the warning reference distance $L_A$ and the automatically braking reference distance $L_B$ are determined so that it is lower as the friction coefficient of the travel road is higher and it is lower as the lateral relative distance is larger.

The operation of the first embodiment will be described below. A lateral relative distance between the subject vehicle $C_0$ and the vehicle $C_C$ is calculated in the lateral relative distance calculating means 7, and a collision avoidance level determining factor K, which is smaller as the lateral relative distance is larger, is determined in the collision avoidance level determining means 9. In judging the possibility of the collision in the judging means 2, the level of judgment of the possibility of the collision is changed in additional consideration of the collision avoidance level determining factor K. That is, the warning reference distance $L_A$ and the automatically braking reference distance $L_B$ are changed so that they are smaller, as the lateral relative distance is larger. Therefore, when the collision can be avoided by a steering operation conducted by a driver as the lateral relative distance between the subject vehicle $C_0$ and the vehicle $C_C$ is larger, the frequency of operation of the warning actuator $A_A$ and the automatically braking actuator $A_B$ can be decreased to enhance the drive feeling. When the lateral relative distance is smaller, the warning actuator $A_A$ and the automatically braking actuator $A_B$ can be early operated to make the time more fit for a driver's feeling.

Moreover, in the determination in the collision avoidance level determining means 9, the friction coefficient of the travel road surface is also used as a parameter in addition to the lateral relative distance between the subject vehicle $C_O$ and the vehicle $C_C$ traveling ahead of the subject vehicle. On a travel road surface having a higher friction coefficient which enhances the capability to avoid the collision by the steering operation, the warning actuator $A_A$ and the automatically braking actuator $A_B$ are decreased and hence, the timing can be more fitted to the driver's feeling. When the friction coefficient of a travel road surface is lower, a lateral force capable of being insured in the wheel is relatively small and hence, the responsiveness of steerage of the vehicle by The steering operation is relatively low. Consequently, the rate of variation in collision avoidance level determining factor K with the variation in lateral relative distance is set so that it is smaller as the friction coefficient of a travel road surface is lower. Therefore, on a travel road surface having a lower friction coefficient, the warning reference distance $L_A$ and the automatically braking reference distance $L_B$ can be increased irrespective of the variation in lateral relative distance, and the warning actuator $A_A$ and the automatically braking actuator $A_B$ can be early operated to reliably achieve the avoidance of the collision.

Figure 4:
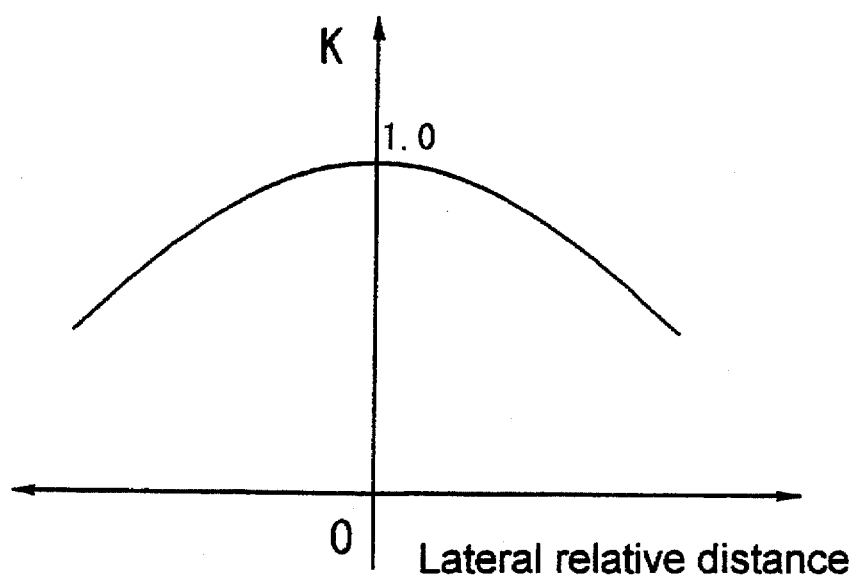
FIG. 4 shows the collision avoidance level determining factor similar to FIG. 3, but according to a second embodiment of the present invention.

In a second embodiment of the present invention, the collision avoidance level determining factor K determined in the collision avoidance level determining means 7 may be set based on only the lateral relative distance between the subject vehicle $C_O$ and the vehicle $C_C$ traveling ahead of the subject vehicle, as shown in FIG. 4.

In addition, the collision avoidance level determining factor K determined in the collision avoidance level determining means 7 may be set using, as parameters, a friction coefficient of a travel road surface, a distinction of day and night, a weather, the presence and absence of a steering operation by the driver, the presence and absence of a braking operation by the driver, a driver's arousal state, a subject-vehicle travel speed and the like in addition to the lateral relative distance between the subject vehicle $C_O$ and the vehicle $C_C$. Further, only the automatically braking reference distance $L_B$ in the judging means 2 may be changed based on the collision avoidance level determining factor K determined in the collision avoidance level determining means 7. As shown by a dashed line in FIG. 1, in place of inputting of the collision avoidance level determining factor K to the judging means 2, the collision avoidance level determining factor K may be input to the operation control means 6, thereby changing the operation level of the warning actuator $A_A$ and the operation level of the automatically braking actuator $A_B$, for example, changing the magnitude of a warning sound or the magnitude of a deceleration provided by the automatic braking.

Although the embodiments of the present invention have been described in detail, it will be understood that the present invention is not limited to the above-described embodiments, and various modifications may be made without departing from the spirit and scope of the invention defined in claims.

For example, in the judging the possibility of the collision in the judging means 2, the yaw rate is used as a parameter in the embodiment, but the present invention is applicable to a collision preventing system which is designed so that the judgment of the possibility of the collision is carried out at least based on a value measured in the distance measuring unit 1 and a subject vehicle speed detected by the subject-vehicle speed detecting means 4. In addition, the level of judgment of the collision possibility or the operation level of the actuator may be changed based on the lateral relative distance between the subject vehicle and the vehicle and the width of the vehicle based on the coordinates points $(X_1, Y_1)$ and $(X_2, Y_2)$ of the reflectors located on the opposite sides of the rear portion of the vehicle $C_C$.

What is claimed is:

1. A vehicle collision preventing system comprising: a distance measuring unit for calculating longitudinal and lateral distances from a subject vehicle to an object ahead of the vehicle by transmitting a signal in a forward direction of the vehicle within a predetermined lateral range and receiving a signal reflected from the object; a subject-vehicle speed detecting means for detecting a travel speed of the subject vehicle; a judging means for judging a possibility of collision of the subject vehicle against the object at least based on a value measured by said distance measuring unit and a subject vehicle speed detected by said subject-vehicle speed detecting means; an actuator for conducting an action required for avoiding the collision of the subject vehicle against the object; and an operation control means for controlling the operation of the actuator based on the result of said judgment in said judging means, wherein said collision preventing system further includes a lateral relative distance calculating means for calculating a lateral relative distance between the subject vehicle and the object based on the value measured by said distance measuring unit; and a collision avoidance level determining means for changing, based on a value calculated by said lateral relative distance calculating means, any one of a judge level in the judgment of a possibility of collision in said judging means and an operation level of the actuator determined by said operation control means based on the result of said judgment by said judging means.

* * * * *